M. J. McEWAN.
WATER-CLOSET.
No. 187,545. Patented Feb. 20, 1877.
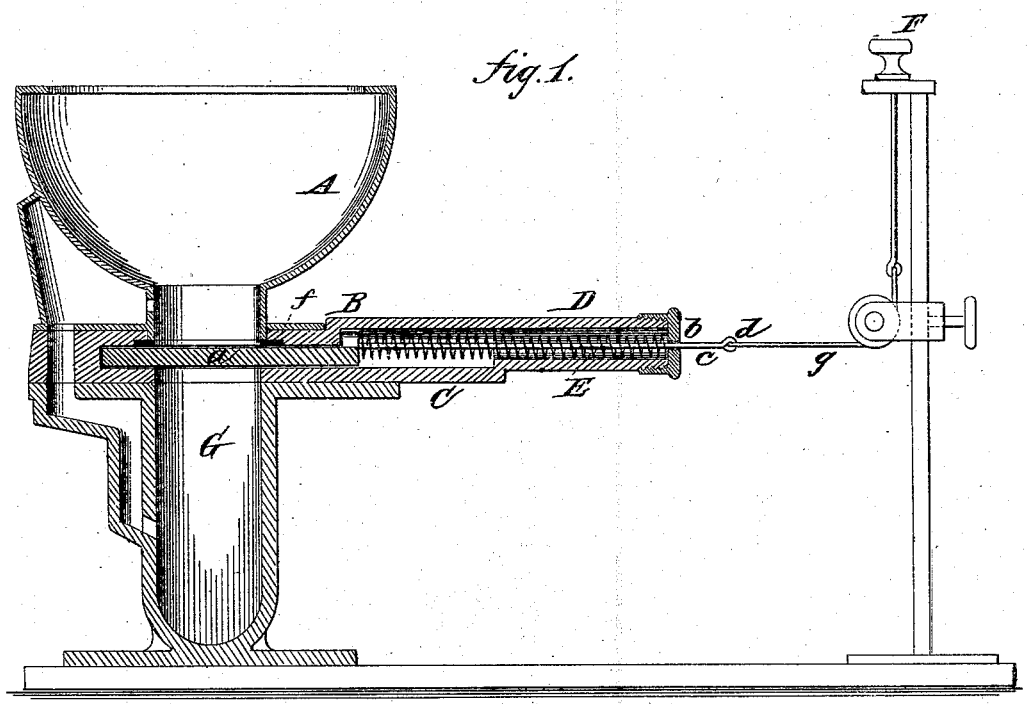
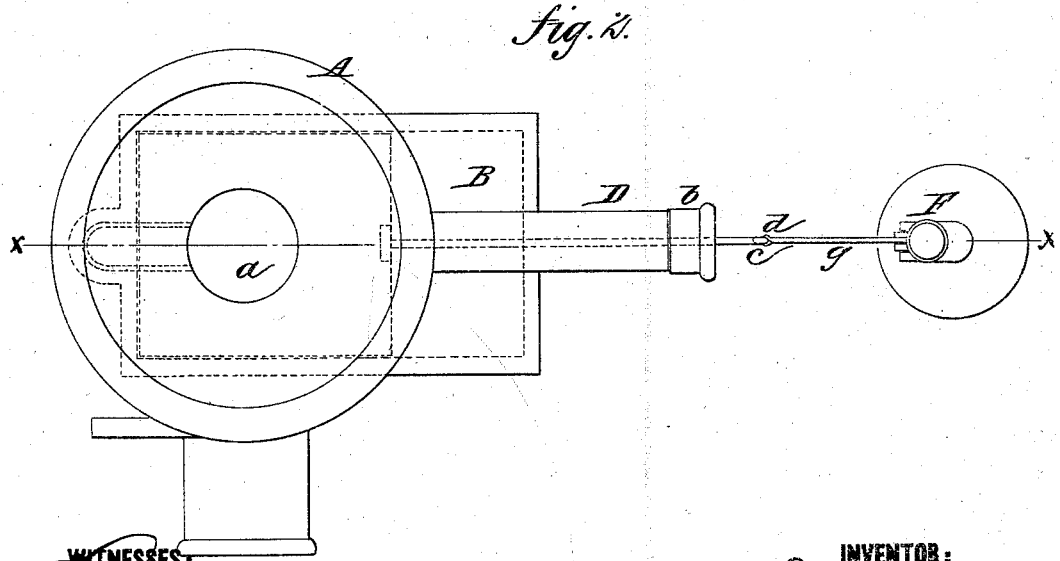

UNITED STATES PATENT OFFICE.

MICHAEL J. McEWAN, OF NEW YORK, N. Y.

IMPROVEMENT IN WATER-CLOSETS.

Specification forming part of Letters Patent No. 187,545, dated February 20, 1877; application filed August 7, 1876.

*To all whom it may concern:*

Be it known that I, MICHAEL J. MCEWAN, of the city, county, and State of New York, have invented a new and Improved Water-Closet, of which the following is a specification:

Figure 1 is a vertical section on line $x\ x$ in Fig. 2, and Fig. 2 is a plan view.

Similar letters of reference indicate corresponding parts.

This invention consists in the arrangement of a sliding valve at the bottom of a closet-bowl, for dropping the contents of the bowl into the trap, and for preventing the rising of effluvia from the trap or sewer below.

A represents an ordinary water-closet bowl, which is fitted to a plate, B, that forms the cover of the slide-valve casing. C is the casing attached to the trap G, and containing a slide-valve, $a$. D is a tube extending from the casing in line with the valve, and having a stuffing-box, $b$, at its outer end. A rod, $c$, is attached to the valve $a$, and runs out through the stuffing-box $b$, and is provided with an eye, $d$. E is a spring, resting against the stuffing-box $b$, and pressing against the valve $a$. The valve is of sufficient size to close the passage from the bowl into the trap. $f$ is a rubber packing-ring, which the valve presses when it is closed, making an air-tight joint. F is the ordinary knob for operating the valves of the water-closet, which is connected by the cord or chain $g$ with the rod $c$. The valve is opened by pulling the knob F when the excrementitious matter and water are allowed to pass out into the trap G. The spring E returns the valve to its seat.

Any ordinary device may be used to control the supply of water to the bowl. The advantages claimed for this invention are, that the sliding valve takes the least possible amount of room, and as a consequence there is no chamber for the accumulation of gases. The valve forms a tight joint with the rubber packing, and prevents the rising of effluvia.

Having thus described my invention, I claim as new and desire to secure by Letters Patent—

1. The casing C and tube D, arranged as shown with respect to bowl A, and provided with slide-valve having spring $e$, as shown and described, for the purpose specified.

2. The combination of the valve $a$, packing $f$, casing C, tube D, stuffing-box $b$, rod $c$, spring E, bowl A, and trap G, substantially as specified.

MICHAEL J. McEWAN.

Witnesses:
C. SEDGWICK,
ALEX. F. ROBERTS.